US008889221B2

(12) United States Patent
Sappok et al.

(10) Patent No.: US 8,889,221 B2
(45) Date of Patent: Nov. 18, 2014

(54) METHOD FOR REDUCING PRESSURE DROP THROUGH FILTERS, AND FILTER EXHIBITING REDUCED PRESSURE DROP

(71) Applicant: Massachusetts Institute of Technology, Cambridge, MA (US)

(72) Inventors: Alexander Sappok, Cambridge, MA (US); Victor Wong, Peabody, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 12 days.

(21) Appl. No.: 13/915,014

(22) Filed: Jun. 11, 2013

(65) Prior Publication Data

US 2013/0269528 A1 Oct. 17, 2013

Related U.S. Application Data

(62) Division of application No. 12/756,602, filed on Apr. 8, 2010, now abandoned.

(60) Provisional application No. 61/169,777, filed on Apr. 16, 2009.

(51) Int. Cl.
*B01D 46/00* (2006.01)
*B01D 39/20* (2006.01)
*B01D 46/24* (2006.01)

(52) U.S. Cl.
CPC .......... *B01D 46/057* (2013.01); *B01D 39/2093* (2013.01); *B01D 46/2455* (2013.01); *B01D 2273/12* (2013.01); *B01D 46/2418* (2013.01); *B01D 2258/012* (2013.01); *B01D 2239/0471* (2013.01)
USPC .......................................................... 427/237

(58) Field of Classification Search
USPC ................................................. 427/230–239
See application file for complete search history.

(56) References Cited

U.S. PATENT DOCUMENTS

| 4,329,162 | A | 5/1982 | Pitcher, Jr. |
| 4,871,495 | A | 10/1989 | Helferich et al. |
| 5,114,581 | A | 5/1992 | Goldsmith et al. |
| 6,837,911 | B2 | 1/2005 | Noda et al. |
| 2002/0011439 | A1 | 1/2002 | Blum et al. |
| 2002/0157358 | A1 | 10/2002 | Noda et al. |
| 2004/0065078 | A1 | 4/2004 | Schafer-Sindlinger et al. |
| 2007/0140928 | A1 | 6/2007 | Beall et al. |
| 2008/0059093 | A1 | 3/2008 | Bromberg et al. |
| 2008/0092499 | A1 | 4/2008 | Otsuka et al. |
| 2010/0135866 | A1 | 6/2010 | Mizuno et al. |
| 2010/0266461 | A1 | 10/2010 | Sappok et al. |

FOREIGN PATENT DOCUMENTS

WO 2008/136232 A1 11/2008

OTHER PUBLICATIONS

Sappok et al., SAE 2008-01-1549, "A Novel Accelerated Aging System to Study Lubricant Addeitive Effects on Diesel Aftertreatment System Degradation," SAE International Journal of Feuls and Lubricants, Apr. 2009, vol. 1, No. 1, pp. 813-827.*
International Search Report and Written Opinion mailed May 19, 2010 in corresponding PCT application No. PCT/US10/30383.
International Preliminary Report on Patentability mailed Oct. 27, 2011 in corresponding PCT application No. PCT/US2010/030383.
SAE 2008-01-1549, SAE International Journal of Fuels and Lubricants, Apr. 2009, vol. 1, No. 1, pp. 813-827, "A Novel Accelerated Aging System to Study Lubricant Additive Effects on Diesel Aftertreatment System Degradation", Sappok, et al.
SAE 2009-01-1086, SAE International Technical Papers, Society of Automotive Engineers, published Apr. 20, 2009, 17 pages, "Characteristics and Effects of Ash Accumulation on Diesel Particulate Filter Performance: Rapidly Aged and Field Aged Results", Sappok, et al.
ICEF 2009-14080, Proceedings of the ASME Internal Combustion Engine Division 2009 Fall Technical Conference, American Society of Mechanical Engineers, Sep. 2009, pp. 1-17, "Lubricant-Derived Ash Properties and Their Effects on Diesel Particulate Filter Pressure Drop Performance", Sappok, et al.
SAE 2008-01-0618, SAE Technical Paper Series, Society of Automotive Engineers, Apr. 2008, 12 pages, "Study on Wall Pore Structure for Next Generation Diesel Particulate Filter", Mizuno, et al.,.
SAE 2010-01-0811, SAE International Technical Papers, Society of Automotive Engineers, pp. 1-25, published Apr. 12, 2010, "Ash Effects on Diesel Particulate Filter Pressure Drop Sensitivity to Soot and Implications for Regeneration Frequency and DPF Control", Sappok, et al.
SAE 2010-01-1213, SAE International Technical Papers, Society of Automotive Engineers, pp. 1-25, published Apr. 12, 2010, "Characteristics and Effects of Lubricant Additive Chemistry on Ash Properties Impacting Diesel Particulate Filter Service Life", Sappok, et al.
Proceedings of the 9th Diesel Engine Emissions Reduction Conference, Aug. 24-28, 2003, pp. 1-8, "New Cordierite Diesel Particulate Filters for Catalyzed and Non-Catalyzed Applications", Merkel, et al.
Corning, 2003, 28 pages, "New Cordierite Diesel Particulate Filters for Catalyzed and Non-Catalyzed Applications", Merkel, et al.
Office Action-Restriction-mailed Oct. 5, 2012 in corresponding U.S. Appl. No. 12/756,602.
Office Action mailed Nov. 6, 2012 in corresponding U.S. Appl. No. 12/756,602.
Office Action mailed Mar. 18, 2013 in corresponding U.S. Appl. No. 12/756,602.

* cited by examiner

*Primary Examiner* — William Phillip Fletcher, III
(74) *Attorney, Agent, or Firm* — Nields, Lemack & Frame, LLC

(57) ABSTRACT

Methods for generating and applying coatings to filters with porous material in order to reduce large pressure drop increases as material accumulates in a filter, as well as the filter exhibiting reduced and/or more uniform pressure drop. The filter can be a diesel particulate trap for removing particulate matter such as soot from the exhaust of a diesel engine. Porous material such as ash is loaded on the surface of the substrate or filter walls, such as by coating, depositing, distributing or layering the porous material along the channel walls of the filter in an amount effective for minimizing or preventing depth filtration during use of the filter. Efficient filtration at acceptable flow rates is achieved.

19 Claims, 5 Drawing Sheets

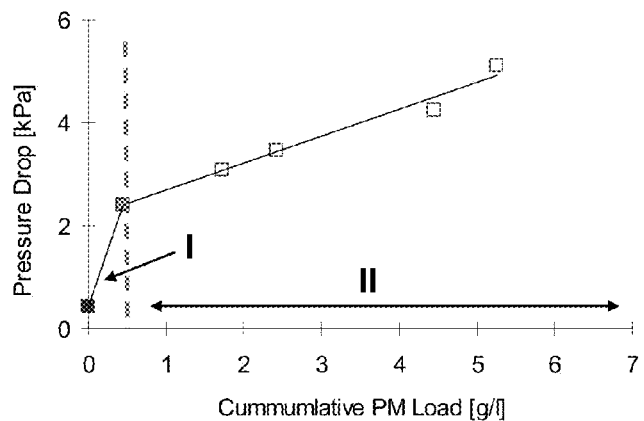
Figure 1. Typical depth (I) and cake (II) filtration regimes for soot accumulation in a DPF with no ash at 20,000 hr-1 space velocity.
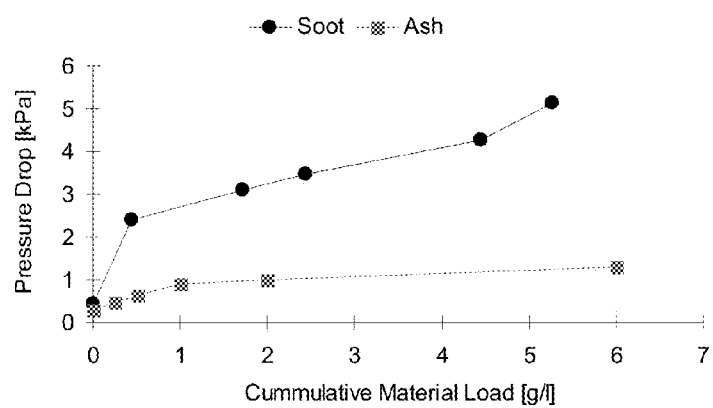
Figure 2. Comparison of individual soot and ash effects on DPF pressure drop as a function of material loading.

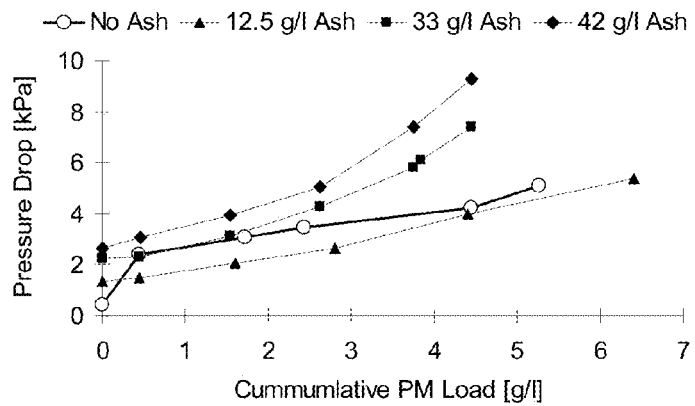
Figure 3. Pressure-drop as a function of soot accumulation on a Pt-catalyzed DPF at various stages of filter coating generated from CJ-4 oil measured at 20,000 hr$^{-1}$ space velocity.
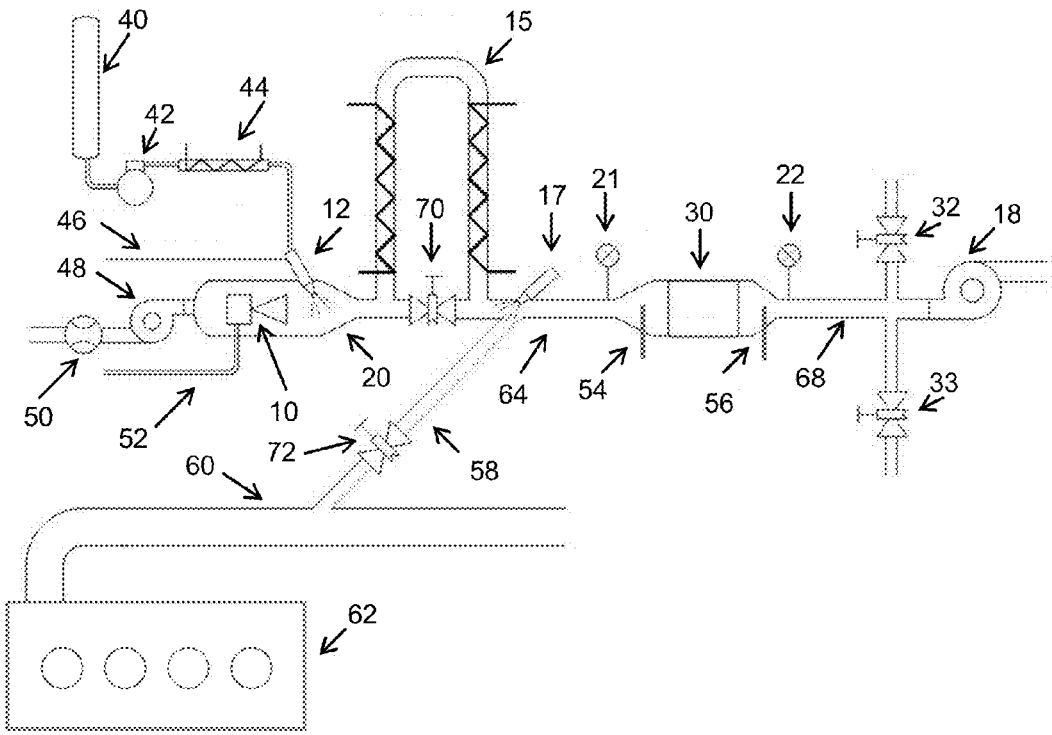
Figure 4. System for generating filter coatings/membranes to prevent depth filtration.

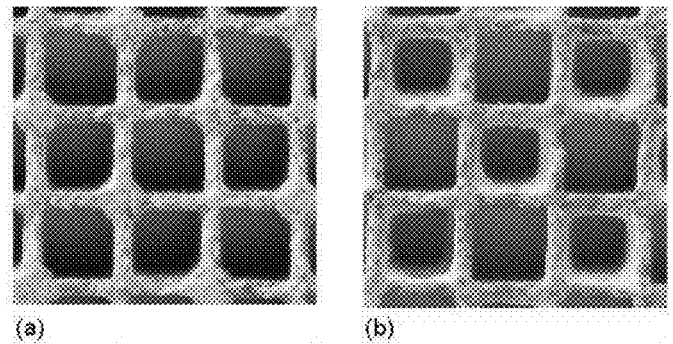
Figure 5(a) and (b). Comparison of filter coatings 57 mm from DPF face for (a) uncoated and (b) coated DPF.
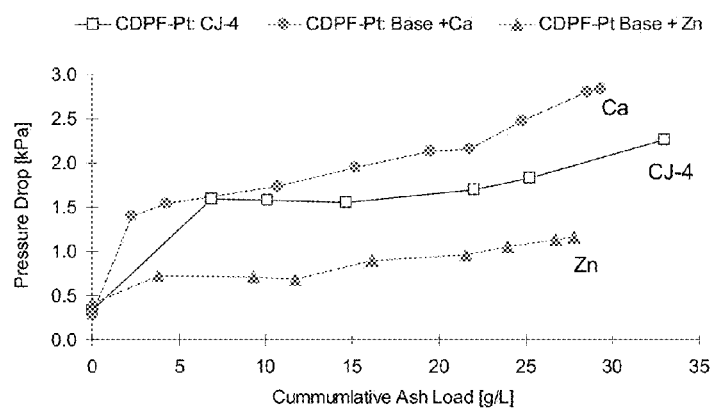
Figure 6. Pressure-drop trends as a function of filter coating composition and amount for a conventional CJ-4 oil and oils formulated to 1% sulfated ash and only containing a calcium detergent and ZDDP additive.

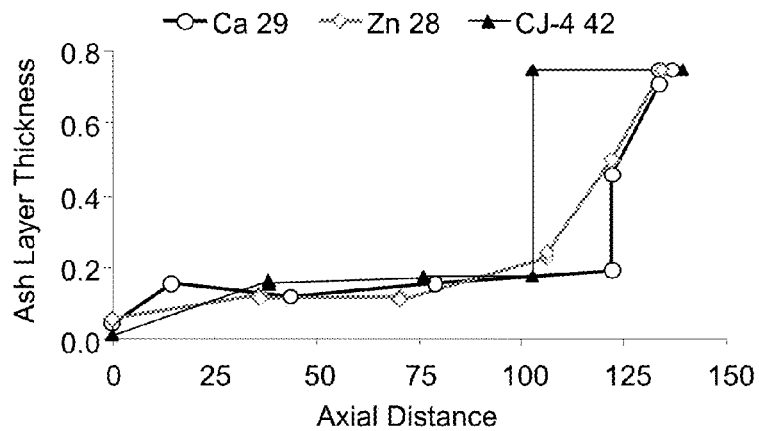
Figure 7. Coating layer thickness profiles measured 36mm from DPF centerline for DPFs containing coatings generated from a fully formulated CJ-4 oil, base oil + Ca detergent, and base oil + ZDDP.
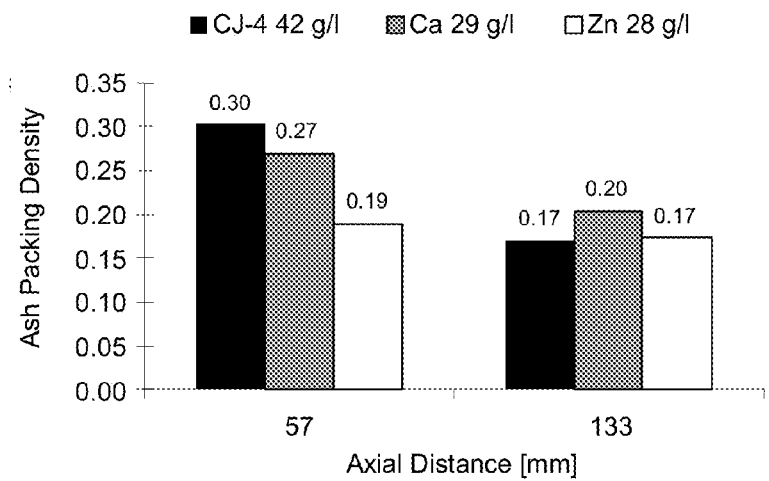
Figure 8. Comparison of coating packing density variations axially along DPF channels with varying lubricant chemistry.

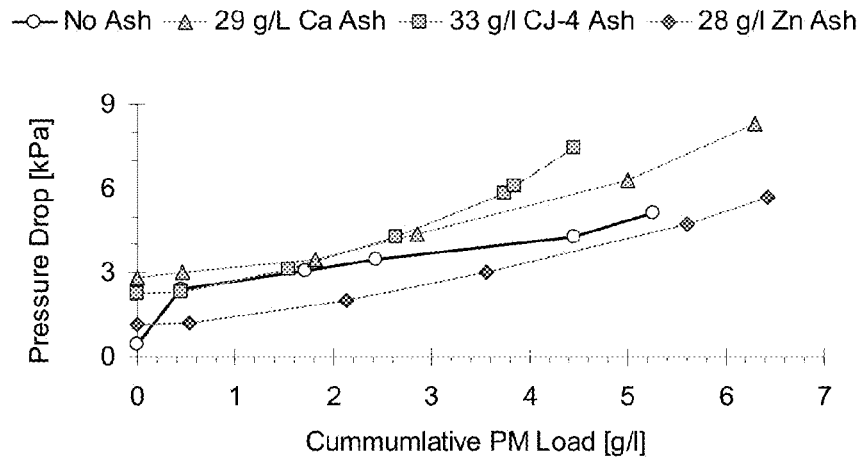
Figure 9. Pressure-drop as a function of soot accumulation on a Pt-catalyzed DPF with varying coating chemistries at 20,000 hr-1 space velocity.
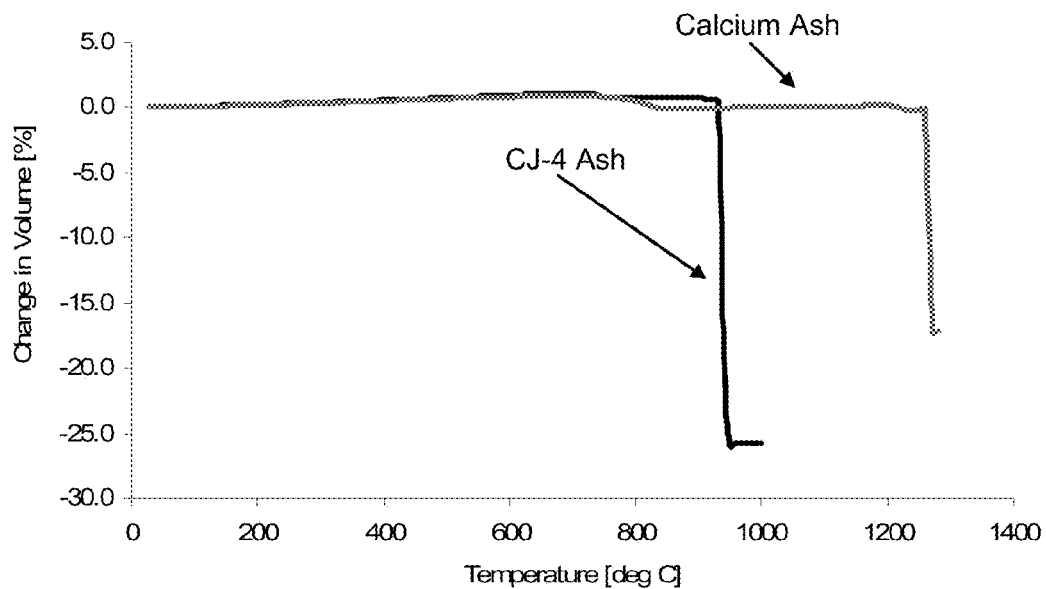
Figure 10. Change in coating volume as a function of temperature for various coating compositions.

US 8,889,221 B2

METHOD FOR REDUCING PRESSURE DROP THROUGH FILTERS, AND FILTER EXHIBITING REDUCED PRESSURE DROP

This application is a divisional of U.S. Ser. No. 12/756,602 filed Apr. 8, 2010 and claims priority of U.S. Ser. No. 61/169,777 filed on Apr. 16, 2009, the disclosures of which are hereby incorporated by reference.

This invention was made with government support under the U.S. Department of Energy Grant No. DE-AC05000R22725. The Government of the United States of America has certain rights in the invention.

BACKGROUND

Wall-flow filters have a wide range of commercial and industrial applications, including the purification of diesel exhaust. Diesel particulate filters (DPF's) are used on all 2007 and newer on-road diesel engines in the United States in view of stringent emission standards required by the Environmental Protection Agency, along with widespread use throughout Europe, Japan and many other countries. Typically the DPF's are made of a porous ceramic such as cordierite, or silicon carbide, and are monolithic structures that include a plurality of longitudinal passageways defined by porous walls. Alternate ends of the longitudinal passageways are sealed, forcing the gas to flow through the porous walls. These porous walls of the filters trap particulate materials (depth filtration) such as carbonaceous soot, and filtration also occurs on top of the wall surface (cake filtration) as exhaust from the diesel engine enters the filter, passes through the porous walls and exits through the opposite end. The filters can be catalyzed or non-catalyzed. Trapping of particulate matter reduces air pollution caused by diesel engines. Particulate matter from diesel engines may pose serious health risks, including aggravating respiratory disorders such as asthma.

Generally, in the case of a clean filter, material first accumulates in the porous walls, and subsequently builds a cake layer on top of the wall surface. In many cases, the amount of material trapped in the walls of the filter is small relative to the amount of material accumulated in the filter cake. Nevertheless, the small amount of material trapped in the pores inside the filter walls can often contribute 50% or more of the total filter pressure drop. This is illustrated graphically in FIG. 1, which shows the deep-bed and cake filtration pressure drop regimes for a diesel particulate filter. As can be seen by the "No Ash" plot, the particulate matter in the diesel exhaust plugs the pores, there is a large pressure drop, after which the pressure drop proceeds at essentially a steady state rate. Increasing filter pressure drop is undesirable, as it restricts flow through the system and thereby reduces engine efficiency (increases fuel consumption). DPF's are capable of trapping over 99% of soot emitted from diesel engines. Soot build-up increases flow restriction through the filter and exhaust backpressure, requiring periodic filter cleaning or change-out. The DPF can be cleaned or "regenerated" by burning-off the accumulated soot through various means. Filter regeneration can be continuous or periodic, the latter typically occurring on the order of every 10 hours. Regeneration typically incurs a fuel economy penalty.

It therefore would be desirable to reduce the filter pressure drop and extend filter regeneration intervals, preferably without compromising filtration efficiency.

SUMMARY

Disclosed herein are methods for generating and applying coatings to filters with porous material in order to reduce large pressure drop increases as material accumulates in a filter, as well as the filter exhibiting reduced and/or more uniform pressure drop. In certain embodiments, the filter is a diesel particulate trap for removing (such as by collection and combustion) particulate matter such as soot from the exhaust of a diesel engine. In certain embodiments, porous material such as incombustible material such as synthetically produced ash is loaded on the surface of the substrate or filter walls, such as by coating, depositing, distributing or layering the porous material along the channel walls of the filter in an amount effective for minimizing or preventing depth filtration during use of the filter. By minimizing or eliminating depth filtration, i.e., by substantially preventing particulate matter from entering and being retained by the pores of the filter, filtration by cake filtration proceeds almost immediately, and the concomitant rapid increase in pressure drop exhibited by conventional filters is reduced or eliminated. Elimination of the rapid rise in pressure drop, associated with depth filtration, results in a more gradual linear rise in pressure drop and allows for better control of the regeneration cycle, since initiation of a regeneration cycle can be based on pressure drop measurements. Efficient filtration at acceptable flow rates is achieved. Suitable means for generating and applying the porous coating include combusting coating materials, introducing them as powder into a gas stream passed through the filter, or applying them in the form of a slurry or solution.

BRIEF DESCRIPTION OF THE DRAWINGS

FIG. 1 is a graph of filter loading versus pressure drop of a filter in accordance with certain embodiments;

FIG. 2 is a graph comparing individual soot and synthetically produced ash effects on DPF pressure drop as a function of material loading;

FIG. 3 is a graph of cumulative particulate matter load versus pressure drop in a Pt-catalyzed diesel particulate filter at various stages of filter coating with synthetically produced ash generated from CJ-4 oil measured at 20,000 hr-1 space velocity;

FIG. 4 is a schematic diagram of exemplary apparatus that may be used to generate a porous coating of the filter walls in accordance with certain embodiments;

FIGS. 5(a) and 5(b) are photographs taken 57 mm from the face of DPFs for (a) uncoated and (b) coated DPFs;

FIG. 6 is a graph of cumulative synthetically produced ash load vs. pressure drop for several different coating layer compositions, where CDPF is catalyzed diesel particulate filter;

FIG. 7 shows coating layer profiles for DPFs containing coatings generated from several different compositions;

FIG. 8 shows coating packing density variations axially along DPF channels for several different coating compositions;

FIG. 9 is a graph of pressure drop versus cumulative particulate matter load in a Pt-catalyzed diesel particulate filter at various stages of filter coating with various compositions, measured at 20,000 hr-1 space velocity; and FIG. 10 is a graph of volume versus temperature for CJ-4 ash and calcium ash, thereby showing the sintering temperature.

DETAILED DESCRIPTION

In preferred embodiments disclosed herein, the filter is a diesel particulate filter including one or more usually parallel channels defined by porous walls, such as walls made of extruded cordierite or silicon carbide in the form of honeycombs. Other rigid, refractory materials are also suitable, including materials made from zirconia, alumina, silicates, alumino-silicates, ceramic foam, mullite, etc. Preferably the filters are made of a self-supporting material and are monolithic, having the structural and dimensional stability necessary to withstand the high operating temperatures used during combustion and regeneration. The channels are blocked at alternate ends, thereby forcing the exhaust gasses to flow through the porous walls between the channels (e.g., wall-flow) before exiting the filter, with the particulate matter that cannot pass through the walls depositing within the channels and/or on top of the wall surface (cake filtration). Although diesel particulate filters are exemplified herein by way of illustration, those skilled in the art will appreciate that the present disclosure is also applicable to other filters where minimization of pressure drop is an objective.

In certain embodiments, the filter is made of porous solid material such as an inorganic material, e.g., cordierite or silicon carbide, having a plurality of pores extending through the material. The pores may be interconnected. The pores are sized such that during filtration, the filter is permeable to fluids, i.e., it allows the passage of fluid, while capturing or restraining within the pores and/or on the filter surface most or all of the particulate matter entrained in the fluid. In certain embodiments, the filter has a cellular structure defined by a matrix of parallel porous walls extending longitudinally from an inlet end face to an outlet end face. In certain embodiments, the filter has a honeycomb structure.

Although the pore size and distribution of the porous walls of the filters are not particularly limited, average pore sizes from about 10 to about 30 μm are suitable, with average pore sizes from about 15 to about 20 μm being more preferable. Porosity values for ceramic honeycomb type filters generally range from 40% to 65% and exhibit permeability values of the order of $1.0 \times 10^{-12}$ m$^2$, however the specific values can vary significantly depending on the filter manufacturer and filter material. The resulting open porosity of the filter walls must be sufficient to allow for fluid to flow completely through the walls while preventing the complete passage of particulate matter. In accordance with certain embodiments, a thin layer of porous material is applied to coat the filter walls, thereby minimizing and preferably preventing contaminants (soot, ash, etc.) from entering the filter pores during use. Soot is carbonaceous matter, sulfates, condensed hydrocarbons, and engine-produced ash.

In one embodiment, the pore size of the filter coating is smaller than the pore size of the filter to which it is applied, thereby preventing contaminant materials such as soot from accumulating in the filter pores. The pore size of the filter coating may or may not be smaller than the average particle size of the contaminant material trapped in the filter.

In certain embodiments, the porous material used for coating or layering the filter walls or loading the filter walls with porous material can be generated by combustion, such as by combusting hydrocarbons doped with some incombustible additives. In conventional diesel particulate filters, incombustible material (ash) remains and accumulates in the filter over time following regeneration. In accordance with certain embodiments, this phenomenon is effectively accelerated, intentionally loading, such as by coating or layering the filter walls with a porous material, such as an incombustible material such as synthetically produced ash, to minimize or prevent depth filtration from occurring when the filter is placed in use.

In one embodiment a specific filter coating level of 12.5 grams of coating per liter (g/L) of filter volume is sufficient to prevent depth filtration, as shown in FIG. 3. It is, however, desirable to minimize the amount of coating required to prevent depth filtration. In some cases, the coating amount may be as little as 2 g/L or less. The amount of coating material may be determined by weighing the filter at predetermined intervals during the coating process. Measurement of filter pressure drop during the coating process may also be used to determine when the desired coating level has been achieved, in one example. In another example, knowledge of the coating generation or application rate and duration of the coating process may also be used to determine when a sufficient amount of coating material has been applied to the filter.

FIG. 2 compares soot and ash effects on DPF pressure drop as a function of material loading. Although ash also exhibits some depth filtration initially, the amount of depth filtration and the associated rise in pressure drop is much less than that observed for soot. The filter soot loading data presented in the figure was generated using a medium-duty diesel engine, whereas the ash loading data was generated using the burner system depicted in FIG. 4. The figure clearly illustrates the significant differences between soot and ash permeability, porosity, and packing characteristics, and their resulting effect on filter pressure drop. Typical values of soot packing densities in DPFs may be around 0.1 g/cm$^3$ and permeability values for soot layers accumulated on the filter walls may be in the range of $1.0 \times 10^{-14}$ m$^2$ to $3.0 \times 10^{-14}$ m$^2$. In contrast to soot, packing densities for the ash may be two or more times greater than for soot, however ash permeability may be an order of magnitude larger than the soot. The increased permeability of the ash gives rise to the reduction in pressure drop for the same level of ash and soot loading exhibited in FIG. 2. The ash layer properties, (permeability, packing density, and mean pore size) may be influenced by the ash composition, flow velocities through the filter, and filter thermal history, among other factors.

For example, a thin layer or coating of porous material is distributed, deposited or otherwise applied along the channel walls to act as a physical barrier to minimize or prevent contaminant material from entering the filter pores during filtration (e.g., during operation of a diesel engine), such as is shown in FIG. 5(b) (compared to FIG. 5(a) with uncoated filter walls). The formation of the porous layer initially is critical to minimize or prevent combustible contaminants (e.g., soot) and non-combustible contaminants such as metallic ash, from entering the porous material when placed in use. As a result, depth filtration is minimized or eliminated, as loading the walls with the porous material provides a physical barrier that inhibits particulate matter from entering the pores. The contaminant material instead forms a filter cake on the surface of the filter walls immediately, thereby partially or completely eliminating the depth filtration regime, while filtrate passes through the walls. Elimination of the deep-bed filtration regime eliminates the associated rapid increase in pressure drop (region I in FIG. 1), as shown in FIG. 1. The cake filtration process is characterized by a much more gradual increase in filter pressure drop as material accumulates on the filter walls, as shown by region II in FIG. 1. For example, combustion can be carried out with a burner, such as a diesel burner, into which inorganic material diluted in a hydrocarbon carrier liquid, is introduced. Combustion of the hydrocarbon carrier liquid containing inorganic additives produces small particles of the inorganic material. This essentially mimics the production of the byproducts normally produced by the diesel engine, only on an accelerated basis. Suitable inorganic materials include zinc, calcium, magnesium and/or iron compounds, in the form of oxides, sulfates, and phosphate. The combustion products can be any inorganic material or combinations of materials. The inorganic materials may be separated in the hydrocarbon carrier liquid and form compounds during the high temperature combustions. The combustion products containing the inorganic materials are caused to flow through the filter with a driving force such as a blower, vacuum or other forced air system. Alternatively, combustion can be carried out by introducing the hydrocarbons into a heated member, such as a chamber or pipe heated electrically or otherwise, to vaporize/oxidize the hydrocarbons and generate ash particles.

The characteristics of inorganic materials formed during combustion of the hydrocarbon carrier liquid and the characteristics of the coatings formed by these materials deposited on the filter may be further influenced following deposition of the filter. In one example, raising filter temperatures in excess of 650° C. may cause the inorganic matter to sinter together, or even to fuse to the filter walls. FIG. 10 presents sintering temperatures for CJ-4 and calcium-based ash and clearly shows CJ-4 ash sintering around 940° C. whereas the calcium-based ash sinters around 1260° C. Zinc-based ash may also sinter at lower temperatures around 720° C. Ash sintering temperatures are a strong function of ash composition and may be lower or higher than the values listed above, depending on the material composition. Addition of catalysts or fluxes may also be used to influence ash sintering characteristics. Modifying the morphology of the inorganic coatings in this manner is beneficial to achieve the desired morphology (minimize pressure drop while maximizing soot trapping efficiency) and provide good adhesion of the inorganic material to the filter. In some cases the ash sintering may be completed during filter production and coating application, and in other cases, the sintering may occur during normal filter operation following installation on the vehicle or machine.

Additional means for generating and applying the porous coating to the filter walls may be used instead of combustor 10. In certain embodiments, the coating materials may be introduced into a flow driven through filter 30 by use of blower 18. Suitable flow rates (filter space velocities) may be in the range of 10,000 l/hr to 100,000 l/hr. Higher flow rates may result in mores densely packed coatings, whereas lower flow rates may result in more loosely packed coatings. Variation of the flow rate during the coating process may also be used to create stratified layers within the coating. In one example the coating material deposited directly on top of the filter wall (bottom coating layer) may be more loosely packed than the top coating layer on which the contaminant material (soot) is collected. The coating materials may be in the form of a powder. Filter 30 may be a single filter or may comprise multiple filters in parallel. The flow may be liquid or gas. In the event the flow is a liquid, blower 18 may be a pump or other suitable device for moving liquid through filter 30. The coating materials thus introduced into the flow may be precursors to the final coating. The morphology and particle size of the coating powder may be controlled by conventional milling, such as by a conventional ball mill, or grinding techniques well known to those skilled in the art, in one embodiment. In one example the particle sizes of the coating powders may be in the range of 1 µm, however larger or smaller particles may also be used. The coating powders may contain catalytic materials, such as precious metals, in one example, to create a multi-function coating, suitable for reducing filter pressure drop and emissions. In one embodiment suitable catalyst loadings may be in the range of 10 g/ft$^3$ to 100 g/ft$^3$ with loadings from 25-50 g/ft$^3$ being more common. From a practical standpoint it may be desirable to minimize catalyst material loading provided acceptable filter performance and durability requirements are met.

The filter coatings created by the inorganic matter may be created and applied in one step or multiple steps (layers). In certain embodiments, a layer containing organic and/or inorganic binder materials may be applied to the filter. In a second step a layer containing different materials may be applied on top of the first layer. The binder materials, thus, serve to promote adhesion of the second layer to the filter walls. The binder may or may not require activations, as by temperature such as in a curing process, or such as by addition of a chemical. An example of suitable binder materials may include zirconia, silica, magnesia, alumina, and titania as well as their oxides in various forms. Other binder materials are also possible.

The inorganic layer thickness is controlled by the concentration of the inorganic materials in the hydrocarbon carrier liquid and the rate of consumption (combustion) of this liquid. Increasing the rate of consumption of the hydrocarbon carrier liquid and/or additive concentration accelerates layer formation. The inorganic material is preferably applied to generate a coating of sufficient thickness to prevent filter depth filtration. As can be seen in FIG. 3, coating amounts can affect pressure drop. Thus, filter coating amounts of 33 g/L and 42 g/L increased filter pressure drop compared to the uncoated case, whereas a filter coating amount of 12.5 g/L resulted in improved pressure drop. One suitable coating thickness is about 0.07 mm. Operable ranges of coating thicknesses may be between 0.002 mm and 0.25 mm, with a preferred range from 0.004 mm to 0.06 mm in some applications. Preferably the coating thickness is substantially uniform along the axial length of the filter. Suitable coating packing densities include about 0.15 to about 0.3 g/cm$^3$, but may be higher or lower depending on the application.

While some small amount of the inorganic material may accumulate in the filter pores, the majority accumulates on the filter surface. In a preferred embodiment the coating is only applied to the filter walls.

One suitable hydrocarbon liquid is lubricant typically used in a diesel engine. Lubricant-derived ash comprises the majority of the ash found in diesel particulate filters where fuel-borne catalysts are not used, and is composed primary of Ca, Zn, Mg, P and S compounds in the form of various phosphates, sulfates and oxides. For example, CJ-4 diesel engine oil having the following elemental composition is illustrative:

TABLE 1

Lubricant elemental composition.

| | ASTM D5185 | | | | | | | |
|---|---|---|---|---|---|---|---|---|
| Lubricant | B (ppm) | Ca (ppm) | Fe (ppm) | Mg (ppm) | P (ppm) | Zn (ppm) | S (ppm) | Mo (ppm) |
| CJ-4 | 586 | 1388 | 2 | 355 | 985 | 1226 | 3200 | 77 |

CJ-4 is an oil specification that is defined by containing no more than 1% ash. To accelerate ash loading and coating generation even further, which would be beneficial to speed up filter manufacture, the ash content of the oils used can be increased. Alternatively or in addition, oil consumption rates can be increased. Suitable oil consumption rates are from about 4 to about 6 ml/min., but could be higher provided smoke generation is minimized. Other potential hydrocarbon carrier liquids include conventional fuels such as gasoline, diesel, heating oils, and others.

Following application of a pre-determined amount of the coating powder, additional steps may be required to achieve the final coating properties and characteristics. In one embodiment, filter 30 may be heated to induce sintering, pyrolysis, or similar transformations of the coating powders. An operable temperature range for the heating process may be from 100° C. to 800° C. At the lower end of the temperature range from 100 to 400° C., the primary function of the heat will be to dry the coating, particularly if applied using a slurry or some other solution, as well as to set the binder material, if present. Temperatures in excess of 600° C., and in some cases even above 800° C., may be used to induce sintering of the coating material to a certain extent, or alter the morphology of the coating layer.

Heat may be applied via use of the combustor 10, electrical heating, or any other suitable means. The temperatures, flow rates, and duration of the heating process may further be used to control the properties of the coating thus applied. Aside from preferentially influencing coating properties, the heat treatment may also be used to promote adhesion of the coating layer to the filter walls. Addition of a binder material, such as alumina, silica, or zirconia, for example to the coating powders introduced into the flow may also be used to promoted adhesion of the coating layers. The binder material may comprise between 1% and 30% of the coating material by weight in one example, with a more suitable range being from 2% to 10% by weight. High levels of binder in the coating material may be undesirable as it may result in a denser coating layer exhibiting increased flow resistance. Aside from heat treatment, in another embodiment the binders may be activated via the introduction of specific chemical activators such as in a curing process. Activators applied to ceramic materials and ash-related coatings include alkaline aqueous solutions in one example, and acids in another example, although any suitable activator may be used.

In yet another embodiment, the coating material may be applied to the filter in the form of a slurry, suspension, or solution. The coating material may consist of alkali or alkaline earth metals in various forms in one example. Suitable metals may include calcium, magnesium, and zinc, and binder materials such as silica and alumina in another example. In one embodiment, the solution may be aqueous and contain metal salts such as calcium or magnesium salts for example, among other components. Other solutions and slurries include washcoats and solutions containing catalysts, and are well known to those skilled in the art, such as aqueous solutions of alkaline earth metal salts and catalyst components including vanadium, platinum, or palladium for example. The slurry or solution containing the coating materials may be introduced into the filter by pouring it directly into the channels, by the application of suction to the filter such as by means of a blower 18, or by submersion of the filter in the liquid-coating mixture, for example. The concentration of the coating particles and binder materials (if used) in the slurry and the number of washcoat applications may be used to control the coating layer thickness. Adding more water to the slurry produces a less viscous solution and thinner coating layers whereas reducing the water content of the solution produces thicker layers and a more viscous solution. Additional drying or chemical activation processes may be applied to remove the solution, leaving the coating materials covering the filter walls. Heat treatment and chemical post-processes may further be utilized to improve adhesion of the coating to the filter walls and preferentially influence the properties of the porous coating.

In one example, the filter coating layer may be applied by means of a solution or slurry. Following application of the solution or slurry, the excess is drained away and the filter is dried at a temperature of 100° C. to 200° C. for around 3 hours. Subsequent exposure of the coated filter to temperatures around 500-700° C. for about 3 hours may promote sintering or calcining of the coating materials to increase the bond strength between the coating and filter substrate, as well as to control the pore characteristics and morphology of the coating layer. Exposure to temperatures above 750° C. may also be utilized to further promote sintering between the specific coating materials.

The slurries and solutions containing the coating materials may also contain conventional catalysts, such as precious metals, or base metal oxides, in one example. Specific catalysts may include platinum, palladium, and rhodium, for example. Additional washcoat components may also be present. In one example the washcoat and catalyst layer me be formed on top of the porous material layer coated on the filter walls and contain γ-alumina, cerium oxide, and platinum or palladium. In this manner a coating may be developed that both reduces depth filtration and pressure drop across the filter, and also improves soot oxidation or reduces exhaust gas emissions such as CO, HC, or NOx, in one example.

In another embodiment, the coating material applied by introduction into a fluid (liquid or gas) stream passed through the filter or in the form of a slurry or solution, may also contain combustible, volatile, or chemically reactive constituents designed to control the resulting pores size. In one example, carbonaceous soot, finely ground wood dust, or charcoal may be mixed in with the coating material and deposited on the filter. Upon application of heat, or specific chemicals, such as acids, in one example, the combustible, volatile, or reactive constituents may be removed from the coating, thereby creating a network of pores. In another embodiment, the pore structure may be influenced by sintering of the coating materials such as by heat treatment as mentioned above. Increasing temperatures above 750° C. and heat treatment duration promotes particle sintering creating a more stable coating layer and increases bond strength between the layer and the filter walls, but also may increase layer flow restriction, in some cases.

Regardless of deposition method, in one preferred embodiment, the pore size of the filter coating is smaller than the pore size of the filter to which it is applied, thereby preventing contaminant materials such as soot from accumulating in the filter pores. The pore size of the filter coating may be smaller than the average particle size of the contaminant material trapped in the filter. Typical agglomerated soot particle sizes may be around 100 nm, whereas soot primary particle diameters may be around 20 nm. In another embodiment the pore size of the filter coating may be smaller than the pore size of the filter to which the coating is applied but larger than the particles trapped by the filter. The preferred pore size may further be determined with respect to the size of the particles filtered from the fluid stream, in another embodiment. It should be noted that the size of the contaminant material trapped on the filter may vary significantly depending on the application.

FIG. 6 shows pressure drop trends as a function of filter coating and amount for a conventional CJ-4 oil and oils formulated to 1% sulfated ash and only containing a calcium detergent and ZDDP (zinc dialkyl dithiophosphate) additive. Coatings containing primarily zinc additives yield lower pressure drop than CJ-4 or calcium-based coatings, and may be preferred in some cases. FIGS. 7 and 8 illustrate differences in coating layer thickness, distribution, and packing density due to differences in coating composition. Packing density controls layer thickness. FIG. 9 clearly shows the zinc coating reduces pressure drop increase with soot loading much more than the other coating formulations at the ~30 g/L coating level. Compared with FIG. 3, Zn-based coatings at 28 g/L perform nearly as well as CJ-4 based coatings at 12.5 g/L. In certain embodiments, the filter can be pre-loaded with carbonaceous matter, or any other combustible material, causing the inorganic matter to form mostly on the channel walls, forming the desired porous layer. The carbonaceous matter so formed in the pores can be removed by thermal oxidation with the burner, thus ensuring that the inorganic material only coats the filter walls and does not enter the pores (the pores remain open). The cycle may or may not be repeated until a desired thickness of the porous inorganic film is formed on the channel walls of the filter. A preferred film thickness may range from 0.004 mm to 0.06 mm in some applications. Alternating loadings of combustible and incombustible material layers in the filter provides another means of controlling the coating morphology. In certain embodiments, soot can be applied to the filter, followed by the addition of the inorganic material, then followed again by combustion of soot. The soot is applied by combusting a hydrocarbon liquid or suitable fuel. It is well known that rich air:fuel ratios promote the formation of soot. In one embodiment soot pre-loading of the filter may be from 0.5 g/L to 6 g/L of soot, followed by application of the inorganic material layer. Following deposition of some or all of the inorganic material, the soot may be combusted, leaving the pores free of deposited material. The amount of soot pre-loaded in the filters also affects the amount of energy released during soot oxidation and may affect the properties of the inorganic layer. By controlling the combustion process, air flow rates and additive chemistry, the deposition and morphology of the porous inorganic layer can be controlled. Thus, the amount of inorganic material being accumulated in the filter pores during formation of the thin porous film can be minimized by initially using a hydrocarbon liquid carrier devoid of the inorganic material for a period of time so that carbonaceous matter will first fill the pores. Then, the burner can be operated with the hydrocarbon liquid having inorganic matter added.

Suitable operating temperatures useful in generating the porous coating are between about 200° C. and about 600° C. High temperature may promote sintering and particle agglomeration. Suitable flow rates are from about 5000 GHSV (gas hourly space velocity) to about 30,000 GHSV. High flow rates may result in more densely packed coatings, and can easily exceed 30,000 GHSV.

In certain embodiments, a catalyst can be added to the porous layer. For example, noble metals such as platinum, other metals such as base metals, and various metal oxides can be added to the inorganic layer, forming a catalytic layer on the surface of the loaded inorganic material. The catalyst, thus deposited and integrated with the inorganic layer, aids in soot oxidation and advantageously can be used to reduce emissions of CO, HC, NOx and other exhaust components (gaseous, liquid and solid phase). In certain embodiments, the catalyst may be used to aid in oxidation of a wide range of contaminants trapped on the filter, or react with various gaseous or liquid constituents flowing through the filter. The identity and amount of such catalysts can be readily determined by the skilled artisan, depending upon the desired result. The catalytic material may be added directly to the hydrocarbon carrier liquid containing the other inorganic additives, or deposited in a subsequent step.

Turning now to FIG. 4, there is shown a suitable system for loading the pores of a filter with soot, ash, or a combination of soot and ash. The ash is designed to form a beneficial membrane, preventing depth filtration. A diesel combustor 10 is provided and fires into a combustion chamber 20. Fuel is supplied to combustor 10 by means of a supply line 52. Airflow to the combustion chamber 20 may be monitored and controlled by an air flow meter and controller 50. Diesel engine oil (or specific ash components found in the oil) is introduced into the combustion chamber 20, such as with an air assisted oil injector 12 mounted on the combustion chamber 20. The oil may be any hydrocarbon carrier liquid containing the inorganic additives and can be injected into the combustor directly by using the air assisted oil injector 12, or by mixing in the diesel fuel for the combustor 10. The hydrocarbon carrier liquid may be supplied from a tank 40, by means of a pump 42 to injector 12. A heat exchanger 44 may be used to control the temperature of the hydrocarbon carrier liquid. An air supply line 46 supplies air to air assisted injector 12. Additionally, vaporized lubricant products and liquid oil mist also may be introduced, such as into the air intake of the combustion chamber 20 or into the burner exhaust stream 64. A heat exchanger 15 is shown downstream of the combustion chamber 20. Heat exchanger 15 is used to control the temperature of the exhaust gases and the inlet temperatures to the DPF 30. Temperature control may be achieved by adjusting the temperature control valve 70, in one example, or by modifying heat exchanger 15 operation in another example. The heat exchanger 15 also may contain heating elements to allow use for both cooling and heating the exhaust gases. A second injector 17 may be mounted upstream or downstream of the heat exchanger 15 to inject the hydrocarbon carrier liquid containing the additives directly into the exhaust. The combustion products and vaporized and liquid lubricant are directed to flow into the filter 30 fixed in an enclosure and located downstream of the combustion chamber 20, by means of a conduit 64. Flow is controlled by a blower 48 upstream of the diesel combustor 10 and a second blower 18 downstream of the DPF 30. Blower 18 is connected to DPF 30 by means of a conduit 68. Valves 32, 33 mounted downstream of the DPF provide additional flow control. DPF pressure drop can be monitored by pressure transducers 21, 22 upstream and downstream, respectively, of the DPF 30. DPF inlet and outlet temperatures may also be monitored by means of temperature sensors 54 and 56 located upstream and downstream of DPF 30, respectively. Temperature sensors may also be located inside the DPF 30.

An engine 62, may or may not be used. In one embodiment, engine 62 is connected to an exhaust system 60. Exhaust system 60 is connected to the DPF inlet conduit 64 by means of conduit 58. In this manner, exhaust products from engine 62, soot for example, may be directed to accumulate on DPF 30. Engine exhaust flow to the DPF 30 may be control by a flow control valve 72, or by adjusting engine 62 operation. In another embodiment, engine 62 may be replaced by a secondary burner or similar device, suitable for generating soot. In yet another embodiment, combustor 10, may be utilized to generate both soot and consume the hydrocarbon carrier liquid supplied by injector 12. The same system may be used to load a plurality of DPFs.

FIG. 10 shows the onset of ash (coating) sintering determined by the rapid decrease in volume of the sample. For CJ-4 ash, the sintering onset temperature is significantly lower than for calcium ash. The CJ-4 ash is composed primarily of Ca, Zn, and Mg compounds in the form of various oxides, sulfates, and phosphates in one example. The calcium ash contains primarily calcium sulfates in another example, and in yet another example calcium oxide may be preferred. Relative to calcium and CJ-4 ash, zinc based ash has shown an even lower sintering onset temperature of about 720° C., in the form of zinc phosphates. Selection of coating composition is dependent upon the expected in use temperatures of the filter as well as the desired flow and pressure drop characteristics. Furthermore, the information shown in FIG. 10 is useful to control ash packing density and morphology via heat treatment. The coating components listed above are intended as illustrative and not in a limiting sense. Those skilled in the art will recognize that many other materials and compounds can be used to develop porous coatings for preventing depth filtration in filters.

EXAMPLE 1

A pre-production Cummins development engine based on the 2002 ISB 300 engine platform was used create a porous material generating and loading system. The ISB 300 is a 6-cylinder, 5.9 liter, turbocharged, direct injection diesel engine. It is rated at 224 kW (300 hp) at 2500 rpm and 890 N-m (600 ft-lb) at 1600 rpm. The ISB 300 is equipped with a high-pressure common rail fuel injection system, variable geometry turbocharger, and cooled exhaust gas recirculation (EGR). Table 2 includes additional details of the engine specifications and geometry:

TABLE 2

Cummins ISB 300 engine specifications

| Engine Parameter | Description |
| --- | --- |
| Model | ISB 300 |
| Maximum Torque | 890 N-m @ 1600 rpm |
| Maximum Power | 224 kW @ 2500 rpm |
| Cylinders | In-line 6 |
| Displaced Volume | 5.9 liters |
| Combustion System | Direct injection, 4-stroke |
| Injection System | Common rail |
| Aspiration | Variable geometry turbocharger and intercooler |

A combustion chamber 20 was connected to the engine exhaust system 60, as shown in FIG. 4. A secondary air-assisted oil injector 12 was mounted on top of the combustion chamber 20 and allows for precise control of lubricant introduced into the combustor. Oil flow to the injector was supplied by a computer controlled constant volume pump 42. A heat exchanger 15 was mounted downstream of the combustor 10 to provide additional control over exhaust temperature, independent of burner settings, allowing for online DPF regeneration. In this manner DPF inlet temperatures were easily controlled between 200° C. and 800° C. A junction after the heat exchanger outlet connects the engine exhaust system 60 to the accelerated porous material loading rig. A portion of the engine's exhaust can be routed to the material loading system that is mixed with ash and particulate matter generated by the combustor 10. Following the heat exchanger 15, the exhaust and combustion products are fed into the DPF 30. A centrifugal blower 18 mounted downstream of the DPF provides additional control over exhaust gas flow rates through the particulate filter 30 during the loading cycle. The operating specifications of the system are as follows:

TABLE 3

Accelerated porous material loading system specifications.

| System Parameter | Description |
| --- | --- |
| Fuel Consumption | 1.5-7.6 L/h |
| Oil Consumption | 0.94-9.4 ml/min |
| Injection Pressure | 700-1400 kPa |
| Air Flow | 266-1130 slpm |
| DPF Inlet Temperature | 200-800° C. |

Both the ISB and the diesel burner were fueled with an ultra-low sulfur diesel (ULSD, 15 ppm S) having the following elemental composition:

TABLE 4

Fuel elemental composition. All values below minimum detectable limits.

| | ASTM D5185 | | | | | |
| --- | --- | --- | --- | --- | --- | --- |
| Fuel | Ca (ppm) | Mg (ppm) | P (ppm) | Na (ppm) | K (ppm) | Zn (ppm) |
| ULSD | <97 | <56 | <1180 | <2010 | <2690 | <155 |

It should be noted that the coating materials may also be doped into the fuel, in some cases. In one embodiment, the burner or engine is used to pre-load the filter with soot, with a preferable soot load being from 0.5 g/L to 6 g/L. The soot loading is accomplished by burning diesel fuel, or any other suitable fuel or oil not containing significant amounts of incombustible materials. Filter soot loading may be carried out at a temperature below the oxidation temperature of the soot (600° C.) such as 250° C. Filter inlet temperatures may be controlled through use of the heat exchanger shown in FIG. 4, or by adjusting the combustion process. Soot loading may be stopped following a predetermined amount of time, when the desired amount of soot has been loaded in the filter.

Following the soot loading step, the hydrocarbon carrier liquid containing the inorganic additives is introduced in the burner to generate the inorganic coating applied to the filter. The blower mounted downstream of the filter is used to draw the combustion products through the filter, causing the inorganic materials to be deposited along the filter walls. The inorganic additives may be introduced in the combustion chamber via the air assisted oil injector, by mixing with the combustor fuel, and/or directly in the air intake system. The inorganic additives may or may not contain additional components such as catalytic materials, binders, etc. The coatings may be generated in a single step, or in multiple steps (layers) by varying the composition of the additives in the hydrocarbon liquid. Varying the combustion process, gas temperatures, and flow rates through the filter during coating generation can be used to generate layers of inorganic material with different properties.

Following application of some or all of the inorganic material to the filter in the manner outlined above, the soot may be oxidized by raising the temperature of the filter above the soot oxidation temperature (600° C.). Soot oxidation may be monitored via filter pressure drop. Following or during the soot oxidation process, additional inorganic material may or may not be applied to the filter. Additional soot may be generated and deposited along with the inorganic matter, or alternately in layers, to affect the morphology of the coatings.

Following deposition of the inorganic coatings the filter may be exposed to a heat treating process designed to increase the adhesion of the inorganic materials to the filter walls and/or modify the morphology of the coating. This may be accomplished by varying gas flow rates, controlling the operation of the heat exchanger, or adjusting combustion.

In another embodiment the steps described above may be repeated without pre-loading the filter with soot, illustrated by the filter performance data in FIG. 3. The data shown in FIG. 3 reflects coatings generated using a CJ-4 oil, the composition of which was listed in Table 1. The oil was consumed in the burner system to generate both soot and ash. The combustion gasses, including the soot and ash, were drawn through the filter by means of the downstream blower at a space velocity of around 20,000 l/hr. In this manner a layer of soot and ash was deposited on the filter. Filter inlet temperatures were alternated between 250° C. for 1 hour (deposition phase) and 620° C. for minutes (soot oxidation phase) successively over the duration of the loading cycle. The 12.5 g/L layer of CJ-4 ash generated in this manner clearly reduces filter pressure drop as a function of soot load, as shown in FIG. 3. The figure also shows a diminishing and even a negative effect on pressure drop (increase in pressure drop) for ash loads greater than 33 g/L relative to an uncoated (no ash) filter.

Similar results were achieved using the method outlined above with the following specially formulated oils:

TABLE 5

| | Lubricant Elemental Composition. | | | | | | | |
|---|---|---|---|---|---|---|---|---|
| | ASTM D5185 | | | | | | | |
| Lubricant | B (ppm) | Ca (ppm) | Fe (ppm) | Mg (ppm) | P (ppm) | Zn (ppm) | S (ppm) | Mo (ppm) |
| Ca Oil | 3 | 2928 | 1 | 5 | 2 | <1 | 609 | <1 |
| Zn Oil | 1 | <1 | <1 | <1 | 2530 | 2612 | 6901 | <1 |

The pressure drop characteristics of the filters containing coatings generated from the oils listed in Table 5 are shown in FIG. 6. For the same level of filter coating by weight (ash load) the zinc-based ash exhibits nearly half the pressure drop of the calcium-based ash, which was slightly higher than the ash generated with the CJ-4 oil. Furthermore, even at a relatively high level of filter coating (28 g/L ash) the zinc-based coatings still results in a reduced filter pressure drop as a function of soot load relative to an uncoated filter (no ash), ash shown in FIG. 9.

While the example described above utilized an engine and burner system, the filter coatings may be applied using only a burner system, or without a burner assembly. If no burner system is used, the coating materials such as in the form of a powder, may be introduced directly into a gas stream flowing through the filter. In another example, the coating may be applied in the form of a solution or slurry. In cases of filters with high cell densities, above 400 cells per in² for example, use of the burner system or gas flows may be advantageous relative to the application of slurries or solutions.

The embodiments described above are intended as illustrative, and not in a limiting sense.

The filters containing coatings of inorganic materials, generated utilizing the system and methods outlined above, exhibit a significant reduction in depth filtration as evidenced in FIG. 3. Soot deposition on the coated filters results in a gradual and steady rise in pressure drop, eliminating the rapid rise in pressure drop observed with the uncoated filter.

What is claimed is:

1. A method of generating and applying a porous coating to the walls of a filter, wherein said filter traps contaminant material, comprising:
   providing a filter downstream of a combustor;
   introducing hydrocarbons into said combustor;
   forcing the resulting combustion products into said downstream filter, and
   allowing said combustion products to accumulate on said walls of said filter in a predetermined amount.

2. The method of claim 1, wherein said hydrocarbons comprise diesel engine oil or diesel fuel.

3. The method of claim 1, wherein the combustion products comprise ash.

4. The method of claim 1, wherein said predetermined amount is an amount sufficient to prevent depth filtration.

5. The method of claim 1, further comprising introducing incombustible material into said combustor and forcing said incombustible material into said downstream filter.

6. The method of claim 5, wherein said predetermined amount is an amount sufficient to reduce contaminant accumulation in said walls of said filter.

7. A method of inhibiting, in a filter having a plurality of longitudinal passageways extending from an inlet end face to an outlet end face and defined by porous walls, depth filtration of particulate matter entrained in a fluid stream, said method comprising loading said porous walls with a porous material in an amount sufficient to cause said particulate matter to form a filter cake on the surfaces of said walls.

8. The method of claim 7, wherein said porous material comprises ash.

9. The method of claim 8, wherein said ash is generated by combusting soot.

10. The method of claim 9, wherein said soot is generated by combusting diesel engine oil or diesel fuel.

11. The method of claim 7, wherein said porous walls are loaded by driving said porous material into said passageways.

12. The method of claim 11, wherein said porous material is driven with a blower or pump.

13. The method of claim 7, wherein said porous walls are loaded by contacting them with a solution or slurry containing said porous material.

14. The method of claim 7, further comprising removing said filter cake by combusting said particulate matter, thereby regenerating said filter.

15. The method of claim 7, further comprising, prior to said step of loading said porous walls with said porous material, allowing soot to accumulate in said pores, and combusting said soot to form a layer of incombustible material above said pores.

16. A method of generating and loading a filter with a porous material, said filter having a plurality of channels, defined by porous channel walls, comprising:
   combusting soot and allowing the products of that combustion to load onto said channel walls;

combusting a composition comprising inorganic material and allowing said inorganic material to load onto said channel walls; and oxidizing the products of said soot combustion.

17. The method of claim 16, further comprising, after said oxidation of said products of said soot combustion, applying additional inorganic material to said channel walls.

18. The method of claim 17, wherein said step of combusting soot is carried out below the oxidation temperature of said soot.

19. The method of claim 17, wherein said inorganic material comprises zinc, calcium, magnesium or iron.

* * * * *